Jan. 14, 1936.   J. B. HOFF   2,027,978
VALVE
Filed May 25, 1935
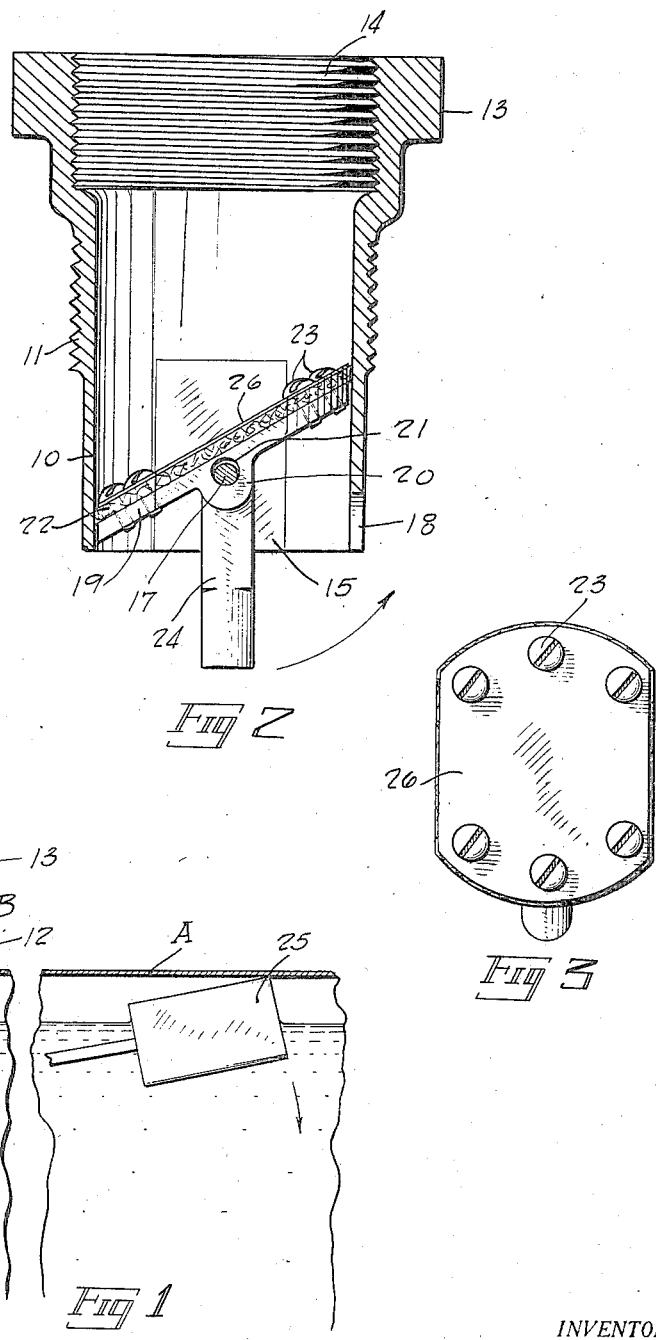

Patented Jan. 14, 1936

2,027,978

UNITED STATES PATENT OFFICE 2,027,978

VALVE

Joseph B. Hoff, Philadelphia, Pa.

Application May 25, 1935, Serial No. 23,420

6 Claims. (Cl. 251—11)

This invention relates to the art of valves and is particularly concerned with that type of valve commonly known as a butterfly valve.

The now known valve mechanism of the so-called butterfly type include a disc which is pivotally mounted so that it may move into closing and opening positions. Due to the fact that the casing in which the disc is mounted is circular, it is not possible to have a surface contact of any appreciable extent between the edges of the disc and the wall of the valve casing. It has been the practice to "feather" the edges of the disc so as to permit of its movement into and out of sealing position.

With the foregoing in mind, this invention has in view, as an important object, the provision of a valve of the butterfly type which includes a disc member having flattened sides and which operates in the casing which conforms in contour with the shape of the disc member. With this arrangement, a valve or disc member of comparatively great thickness may be employed to provide a larger surface contact between the said member and the casing in which it operates.

A further object of the invention is to provide a pivotal mounting for the disc member, as above noted, which provides for a freely floating movement on the part of the said disc member. Carrying out this idea in a practical embodiment, I avail of a pin as a mounting for the disc and which pin has a loose fit in the disc member, thereby affording floating movement on the part of the latter.

Still another object in view is the provision of a pivotal mounting for a valve disc of the above noted type, which mounting is offset from the plane of the disc.

The invention has in view as a further object the provision of a valve disc of the above noted character which includes packing for sealing the joint between the disc and the casing.

With the above noted objects in view, the present invention comprises a valve casing, a disc member which carries packing which is pivotally mounted therein on a loose pivotal connection, and which valve member has parallel flattened sides.

For a full and more complete understanding of the invention, reference may be had to the following description and accompanying drawing, wherein:

Figure 1 is a sectional view taken through a tank with a valve, made in accordance with the precepts of this invention, applied thereto and shown in elevation, Figure 2 is a vertical section through the valve shown at Figure 1, and Figure 3 is a plan view of the disc member.

Referring now to the drawing wherein like reference characters denote corresponding parts, I have shown a valve made in accordance with this invention as applied to a fuel tank, this tank being designated by the reference character A. In Patent No. 1,991,214, issued February 12, 1935, to Joseph B. Hoff and Walter C. Davidson, a valve for controlling the level of fluid in such tanks is fully illustrated and described. The present valve is designed to be applied to this tank for the purpose of controlling the passage of fluid thereinto.

It is to be clearly understood, however, that the use of the valve is not to be so limited, it having a wide field of application, being adapted for use in places where the flow of fluid is to be governed, the illustrated embodiment being merely one practical use of the valve.

The valve assembly is referred to generally by the reference character B and includes a valve casing 10 which is exteriorly threaded at 11 for connection to the top wall of the tank A. This wall is provided with a cylindrical flange 12 which is interiorly threaded and into which the valve casing 10 is screwed to mount the latter in the tank A. This valve casing 10 is also formed on its exterior with wrench engaging means in the form of a hexagonal head 13 which is employed to thread the casing tightly home. The interior of the casing 10 is enlarged at one end and interiorly threaded as illustrated at 14 to provide suitable means for connecting a fluid conduit thereto. Intermediate its extremities, the inner cylindrical wall of the casing is deformed by the provision of flats 15, these flat surfaces being diametrically opposite to one another and in parallel relationship. Extending through the walls of the casing 10, at the flat surfaces 15, are aligned openings 16 which receive a pin member 17, there being a fairly snug fit between the pin and the walls of the opening 16. The lower end of the wall of the casing 10 is cut away to provide a recess 18 for a purpose to be hereinafter set forth.

Referring now particularly to Figures 2 and 3, a disc or valve member, made in accordance with this invention, comprises a main body portion 19 which is enlarged at 20 and this enlargement is provided with an opening 21 which receives a pin 17. Attention is called to the fact that this opening 21 is of larger diameter than the pin 17 so as to provide a loose fit between these parts. A packing designated 22 is secured on the member 19 by means of a plate 26 held by screw members 23. Obviously any desired form of packing may be used.

Operating means for the valve member 19 is shown in the form of a stem 24 which may be integrally formed therewith. As shown in Figure 1, this stem is connected at its lower end to a float member 25 which is movable under variance in the level of fluid in the tank A to move the disc member into sealing and open positions. Figure 1 develops in dotted lines the position of this member 25 when the level of the fluid is lowered and the valve swung into open position.

From the foregoing, it is evident that the valve disc provided, hereby provides a sealing surface between the wall of the casing and the valve member of comparatively great extent which insures good sealing effects. Moreover, the loose pivotal mounting of the valve member insures of it being movable into effective sealing position. Obviously, if it is desired, a ground joint may be availed of between the valve member and the wall of the casing. However, I have shown packing as the preferred embodiment.

It is notable that the recess 18 accommodates the stem 24 when the valve is in open position. When this arrangement of casing and valve member is employed in different assemblies, obviously the recess 18 may be eliminated.

While the preferred specific embodiment of the invention is hereinbefore set forth, it is to be understood that I am not to be limited to the exact constructions illustrated and described because various modifications of these details may be provided in putting the invention into practice within the purview of the appended claims.

I claim:

1. In a valve of the character described, the combination with a valve casing of substantially cylindrical formation but having a portion of non-circular form, said non-circular portion being defined by a pair of spaced parallel flats formed in the casing of a valve member conforming to the shape of the cross-section of the casing and pivotally mounted between the flats.

2. In a valve of the character described, the combination with a cylindrical valve casing having parallel flat surfaces, of a valve member pivotally mounted in the casing between the flat surfaces, said valve member having flat surfaces corresponding to the surfaces of the casing and in engagement therewith, and curved surfaces on the said valve member connecting the flat surfaces.

3. In a valve of the character described, a valve casing, a valve member pivotally mounted in the valve casing, said member being deformed to provide flat sides, the wall of the valve casing having a portion corresponding to the shape of the valve member, the pivotal mounting of the valve member constituting means providing floating movement thereof, and means for moving the valve member.

4. In a valve of the character described, the combination with a valve casing, a valve member movably mounted therein, of a pivotal mounting for the valve member in the casing, said pivotal mounting including a loose fit whereby free floating movement on the part of the valve member with respect to the casing is permitted.

5. A valve of the character described comprising a valve casing having parallel flattened surfaces interiorly thereof, a valve member having flattened surfaces conforming to the surfaces of the casing, the said valve member having an opening therein, the wall of the casing having openings therein in alignment with the opening in the valve member, the opening in the valve member being of greater diameter than the openings in the casing, and a pin extending through the respective openings.

6. A valve of the character described comprising a valve casing having flattened surfaces in parallel relationship, the wall of the casing having aligned openings centrally of the said surfaces, a valve member, packing associated with the valve member, means for maintaining the packing in position on the valve member, the valve member being formed with the opening spaced from the retaining means, operating means for the valve member, and a pin extending through the openings in the casing and valve member respectively.

JOSEPH B. HOFF.